United States Patent
Lee (10) Patent No.: US 12,364,577 B2
(45) Date of Patent: Jul. 22, 2025

(54) INDIRECT BONDING DEVICE AND INDIRECT BONDING METHOD FOR ORTHODONTIC APPARATUS

(71) Applicant: OSSTEMIMPLANT CO., LTD., Seoul (KR)

(72) Inventor: Jeong-Hwan Lee, Busan (KR)

(73) Assignee: OSSTEMIMPLANT CO., LTD., Seoul (KR)

( * ) Notice: Subject to any disclaimer, the term of this patent is extended or adjusted under 35 U.S.C. 154(b) by 346 days.

(21) Appl. No.: 17/641,620

(22) PCT Filed: Sep. 10, 2020

(86) PCT No.: PCT/KR2020/012256
§ 371 (c)(1),
(2) Date: Mar. 9, 2022

(87) PCT Pub. No.: WO2021/049892
PCT Pub. Date: Mar. 18, 2021

(65) Prior Publication Data
US 2022/0323182 A1    Oct. 13, 2022

(30) Foreign Application Priority Data
Sep. 10, 2019    (KR) .......................... 10-2019-0112469

(51) Int. Cl.
*A61C 7/14*    (2006.01)
(52) U.S. Cl.
CPC .................................. *A61C 7/146* (2013.01)
(58) Field of Classification Search
CPC .. A61C 7/02; A61C 7/14; A61C 7/146; A61C 9/00
See application file for complete search history.

(56) References Cited

U.S. PATENT DOCUMENTS

| | | | | |
|---|---|---|---|---|
| 5,114,339 A | * | 5/1992 | Guis | ...................... A61C 7/145 |
| | | | | 433/24 |
| 5,336,086 A | * | 8/1994 | Simmen | ............... A61C 9/0006 |
| | | | | D24/176 |

(Continued)

FOREIGN PATENT DOCUMENTS

| | | |
|---|---|---|
| JP | 2011-4833 A | 1/2011 |
| KR | 10-2002-0004333 A | 1/2002 |

(Continued)

OTHER PUBLICATIONS

International Search Report for PCT/KR2020/012256 dated Feb. 5, 2021 (PCT/ISA/210).

(Continued)

*Primary Examiner* — Cris L. Rodriguez
*Assistant Examiner* — Sydney J Pulvidente
(74) *Attorney, Agent, or Firm* — Sughrue Mion, PLLC (57) ABSTRACT

An embodiment of the present invention provides an indirect bonding device for an orthodontic apparatus, the indirect bonding device comprising: a jig main body part in a form that covers the tooth surface of a subject undergoing a procedure; an accommodation part having grooves capable of accommodating an orthodontic bracket into the internal space of the jig main body part; and a discharge hole part which is formed as at least one hole passing through the inner and outer portions of the jig main body part and through which a bonding agent excessively introduced into the orthodontic bracket is discharged.

8 Claims, 9 Drawing Sheets

(56) References Cited

U.S. PATENT DOCUMENTS

| | | | | |
|---|---|---|---|---|
| 6,123,544 | A * | 9/2000 | Cleary | A61C 7/146 433/74 |
| 2004/0229185 | A1* | 11/2004 | Knopp | A61C 7/146 433/24 |
| 2005/0233276 | A1* | 10/2005 | Kopelman | A61C 7/08 433/3 |
| 2006/0188834 | A1* | 8/2006 | Hilliard | A61C 7/08 433/24 |
| 2006/0223031 | A1* | 10/2006 | Cinader | B33Y 80/00 433/213 |
| 2006/0234179 | A1* | 10/2006 | Wen | A61C 7/00 433/6 |
| 2007/0298364 | A1* | 12/2007 | Cinader, Jr. | A61C 7/146 433/3 |
| 2008/0233530 | A1 | 9/2008 | Cinader | |
| 2010/0159412 | A1* | 6/2010 | Moss | B33Y 80/00 433/24 |
| 2010/0300615 | A1 | 12/2010 | Komori | |
| 2015/0157421 | A1* | 6/2015 | Martz | A61C 7/08 433/6 |
| 2016/0095670 | A1* | 4/2016 | Witte | A61C 7/002 433/24 |
| 2016/0166357 | A1* | 6/2016 | Portalupi | A61C 7/16 433/24 |
| 2018/0206948 | A1 | 7/2018 | Pierson et al. | |
| 2018/0206957 | A1* | 7/2018 | Ruth | A61C 7/023 |

FOREIGN PATENT DOCUMENTS

| | | |
|---|---|---|
| KR | 10-1580444 B1 | 12/2015 |
| KR | 10-1701256 B1 | 2/2017 |
| KR | 10-2017-0103417 A | 9/2017 |

OTHER PUBLICATIONS

Written Opinion for PCT/KR2020/012256 dated Feb. 5, 2021 (PCT/ISA/237).

Extended European Search Report issued Jul. 13, 2023 in European Application No. 20863330.5.

Chinese Office Action dated May 17, 2024 in Application No. 202080063560.5.

* cited by examiner

INDIRECT BONDING DEVICE AND INDIRECT BONDING METHOD FOR ORTHODONTIC APPARATUS

CROSS REFERENCE TO RELATED APPLICATIONS

This application is a National Stage of International Application No. PCT/KR2020/012256 filed Sep. 10, 2020, claiming priority based on Korean Patent Application No. 10-2019-0112469 filed Sep. 10, 2019, the entire disclosures of which are incorporated herein by reference.

TECHNICAL FIELD

The present invention relates to an indirect bonding device and an indirect bonding method for an orthodontic appliance, and more particularly, to an indirect bonding device and an indirect bonding method for an orthodontic appliance through which an excessive bonding agent therein is easily dischargeable and which allow a dental practitioner to recognize whether a jig is adequately fastened in an oral cavity.

BACKGROUND ART

In order to remedy malocclusion of teeth, an orthodontic appliance manufactured using a material harmless to the human body is bonded to teeth and a force of an orthodontic wire is applied to the appliance to treat maloccluded teeth so that they occlude normally. Here, the orthodontic appliance is called a bracket, and treating malocclusion using brackets is referred to as fixed orthodontic treatment or bracket-fixed treatment.

In order to perform orthodontic treatment using brackets as described above, it is necessary to bond corresponding brackets to target teeth which need adjustment. Bonding methods applied here are divided largely into direct bonding methods and indirect bonding methods. A direct bonding method is a method of a dental practitioner bonding a bracket to a desired position of a target tooth to be treated using a tool such as tweezers. An indirect bonding method is a method of more easily and accurately bonding a bracket by manufacturing an arbitrary indirect bonding jig (hereinafter referred to as an IDB jig) according to a specific oral structure of the person being treated and then fastening the IDB jig to the teeth of the person being treated. Recently, the utilization of indirect bonding methods has been gradually increasing.

Figure 1:
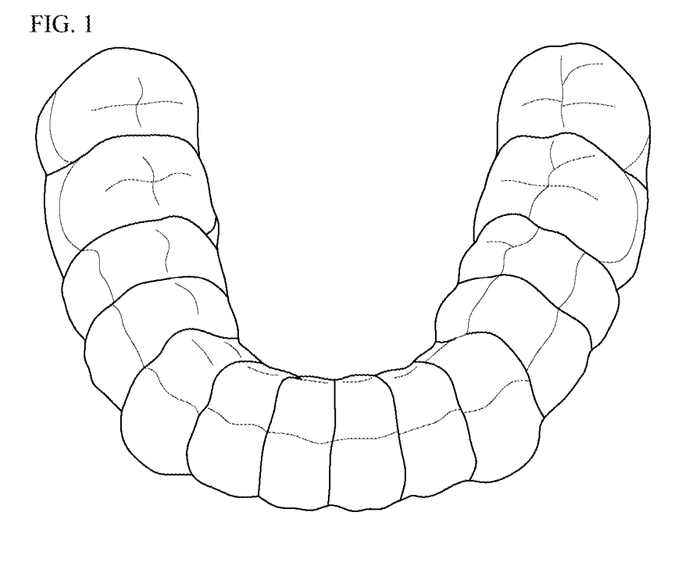
FIG. 1 is a perspective view illustrating an existing indirect bonding device for an orthodontic appliance.

FIG. 1 illustrates an existing general vacuum-forming type IDB jig.

As shown in the drawings, the existing general IDB jig is used while simply covering the teeth of the person being treated. When the existing indirect bonding jig is used, an amount of a bonding agent used for bonding a bracket may be excessive. Here, the bonding agent spreads between the IDB jig and a tooth surface and thus is excessively attached to the tooth surface.

In this case, in order to remove an excessive amount of the bonding agent on the corresponding part, it is additionally necessary for a dental practitioner to separate the IDB jig from an oral cavity and remove the excessive amount of the bonding agent attached to the corresponding tooth surface using a tool such as a bur. Also, there are problems such as a possibility of damage to the teeth and an increase in working time in this process. Also, the excessive amount of the bonding agent interferes with adequate matching between the jig and the teeth, and thus acts as a hindrance which makes it difficult to place the bracket at an accurate position planned by the dental practitioner.

Furthermore, since the IDB jig covers a labial surface, a lingual surface, a mesiodistal surface, and the like surrounding the occlusal surfaces of the tooth when used, it is difficult to see whether the jig is adequately fastened. This ultimately interferes with adequate fastening of the jig and increases a possibility of improper fastening which also makes it difficult to accurately place the bracket.

DISCLOSURE

Technical Problem

The present invention is directed to providing an indirect bonding method and an indirect bonding device for an orthodontic appliance which is a vacuum forming type including a discharge hole for discharging an excessive amount of a bonding agent or a window for seeing whether a jig is fastened.

Technical Solution

One aspect of the present invention provides an indirect bonding device for an orthodontic appliance. The indirect bonding device includes a jig body portion having a shape covering a tooth surface of a person to be treated, an accommodation portion which is an internal space of the jig body portion and in which a groove capable of accommodating an orthodontic bracket is formed, and a discharge hole portion formed as one or more holes passing through the inside and outside of the jig body portion and through which an excessively injected amount of a bonding agent is discharged.

Another aspect of the present invention provides an indirect bonding device for an orthodontic appliance. The indirect bonding device includes a jig body portion having a shape covering a tooth surface of a person to be treated, an accommodation portion which is an internal space of the jig body portion and in which a groove capable of accommodating an orthodontic bracket is formed, and one or more window portions formed in an outer surface of the jig body portion through which the inside is visible.

The jig body portion may be formed of a transparent material.

The jig body portion may include one or more elastic materials.

The jig body portion may be configured to be dividable.

The window portion may be formed as a concave lens in which a central part is thinner than an edge.

The window portion may be formed as a convex lens in which a central part is thicker than an edge.

Still another aspect of the present invention provides a method of bonding an orthodontic appliance indirectly. The method includes manufacturing a cast model by taking an impression of the teeth of a person to be treated, temporarily bonding an orthodontic bracket to a tooth surface of the cast model, manufacturing an indirect bonding device for the orthodontic appliance, the indirect bonding device including a jig body portion having a shape covering a tooth part of the cast model and an accommodation portion which is a space for accommodating the orthodontic bracket, applying a bonding agent to the orthodontic bracket, fastening the indirect bonding device to the teeth of the person being treated, and removing the indirect bonding device from the teeth of the person being treated.

In the fastening of the indirect bonding device to the teeth of the person being treated, an excessively injected amount of the bonding agent in the indirect bonding device may be discharged outward.

In the removing of the indirect bonding device from the teeth of the person being treated, a dental practitioner may remove the orthodontic appliance while viewing the inside of the indirect bonding device with the naked eye.

Advantageous Effects

According to an embodiment of the present invention, since it is possible to easily discharge an excessive amount of a bonding agent used for bonding a bracket, damage to teeth can be prevented and work time can be reduced.

Also, since a dental practitioner can recognize, with the naked eye, a fastening state of an indirect bonding device to a target tooth, it is possible to prevent improper fastening and it is easy to remove the indirect bonding device after treatment.

The effects of the present invention are not limited to the above effects and should be understood as including all effects derivable from the components of the present invention disclosed in the detailed description and the claims of the present invention.

MODES OF THE INVENTION

Hereinafter, the present invention will be described with reference to the attached drawings. However, the present invention may be implemented in a variety of different forms and is not limited to embodiments described herein. Also, irrelevant parts will be omitted in order to clearly illustrate the present invention throughout the drawings, and like elements will be referred to with like reference numerals throughout the specification.

Throughout the specification, when it is stated that one part is "connected" to another part, the part may not only be "directly connected" to the other part but may also be "indirectly connected" to the other part with another intervening part. Also, when one part is stated as "comprising" one element, unless particularly defined otherwise, the part does not exclude other elements and may further include other elements.

Hereinafter, embodiments of the present invention will be described in detail with reference to the attached drawings.

Figure 2:
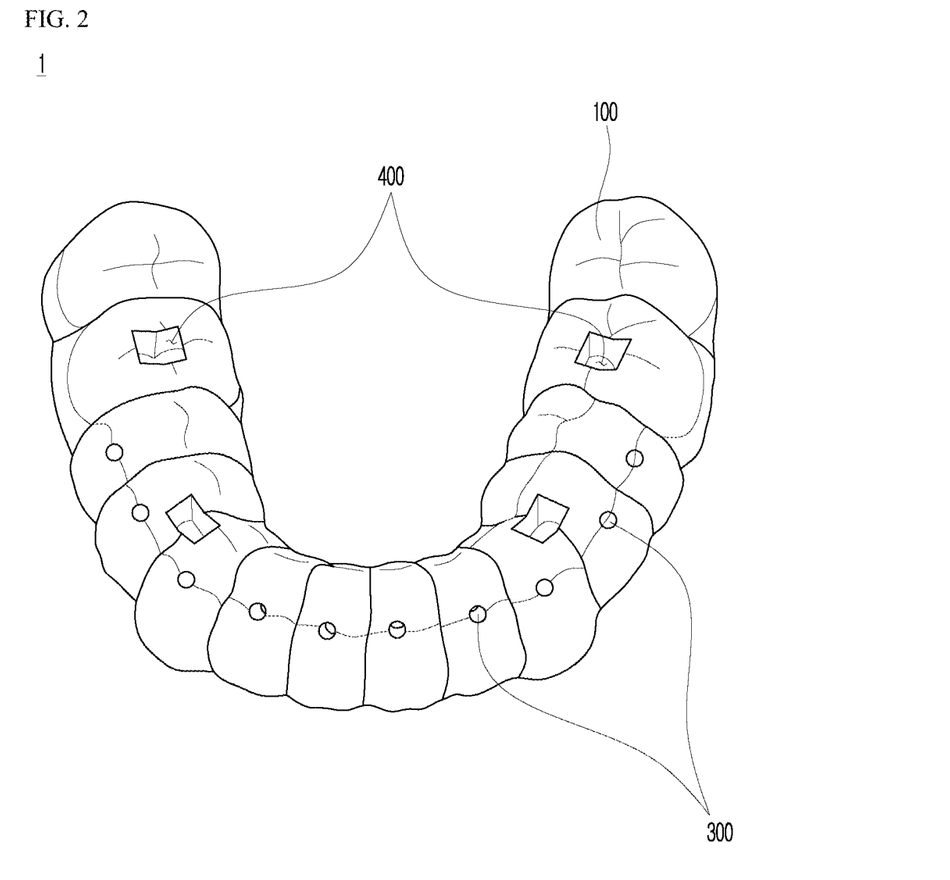
FIG. 2 is a perspective view of an indirect bonding device for an orthodontic appliance according to one embodiment of the present invention.
Figure 3:
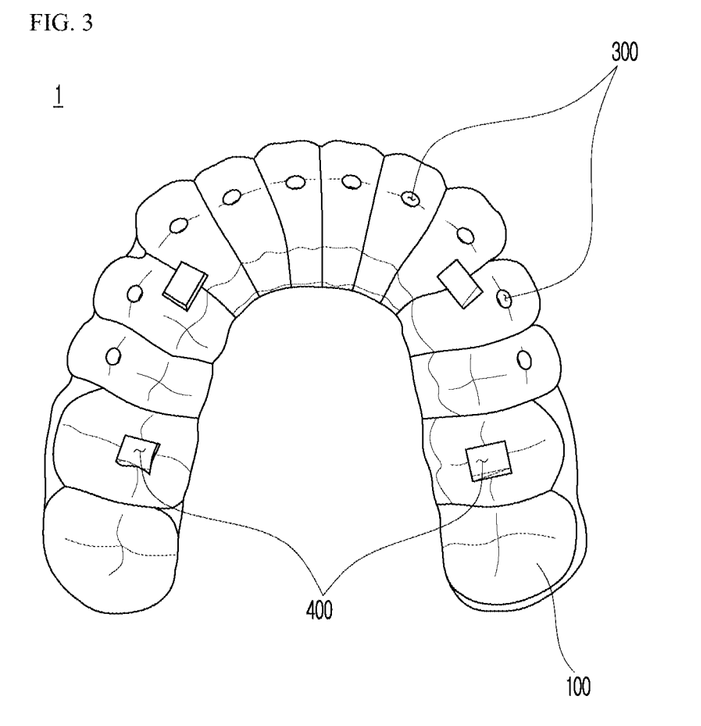
FIG. 3 is a top view illustrating an exterior of a jig body portion according to one embodiment of the present invention.
Figure 4:
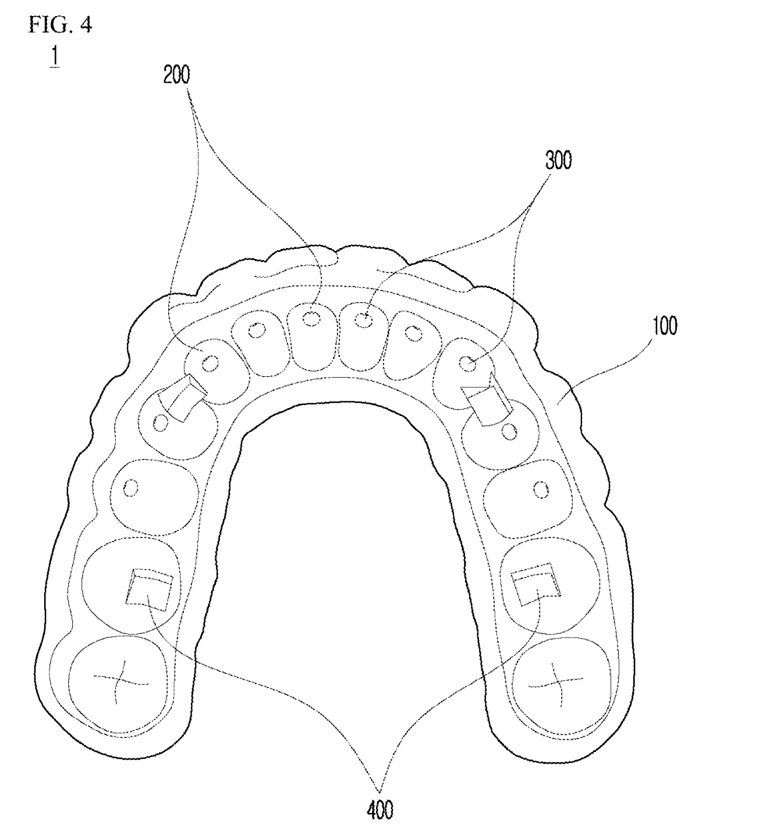
FIG. 4 is a top view illustrating an interior of the jig body portion according to one embodiment of the present invention.
Figure 5:
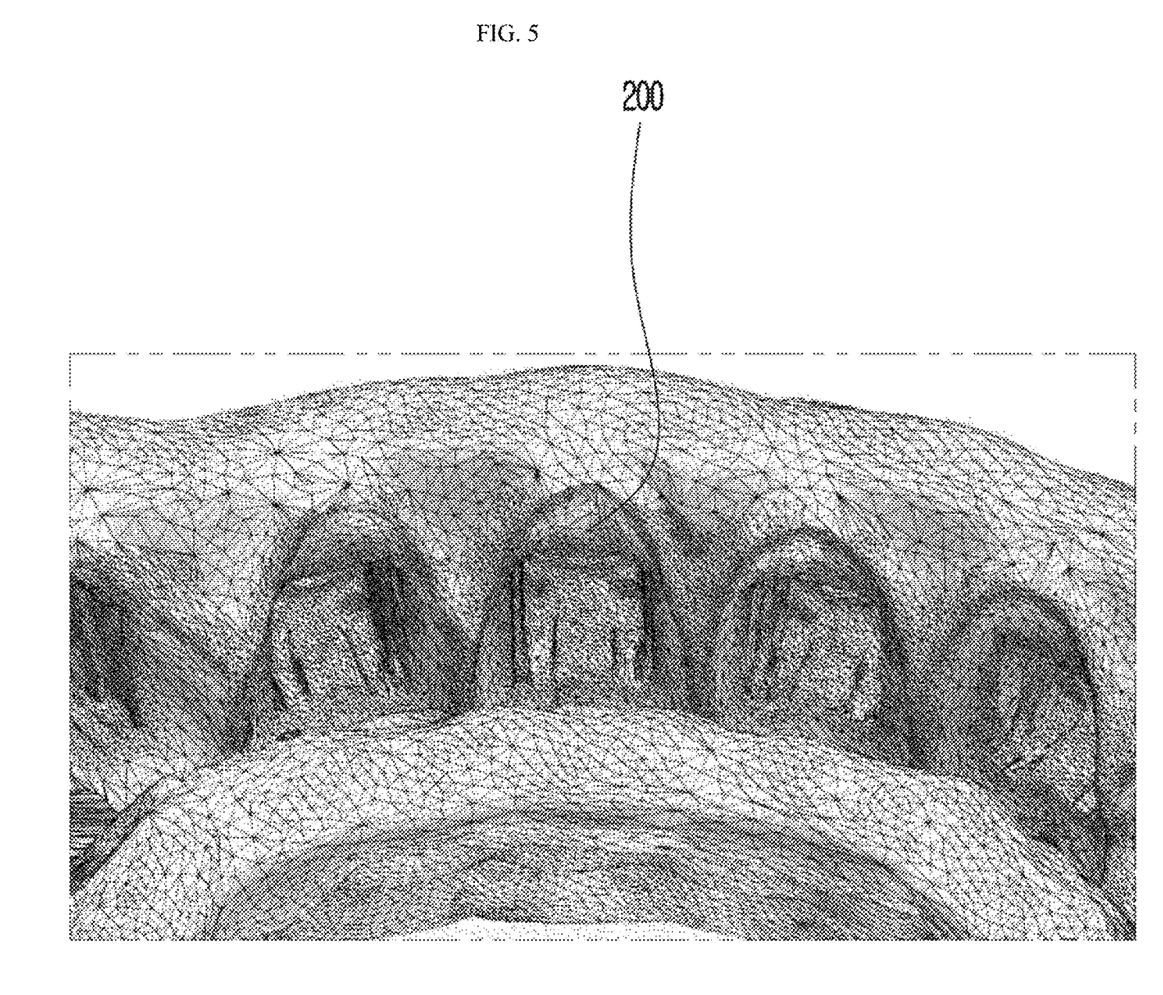
FIG. 5 is an enlarged view illustrating an accommodation portion according to one embodiment of the present invention.

FIG. 2 is a perspective view of an indirect bonding device 1 for an orthodontic appliance according to the present invention, FIGS. 3 and 4 are top views illustrating an exterior and an interior of the indirect bonding device 1 according to the present invention, respectively, and FIG. 5 is a detailed enlarged view illustrating an accommodation portion 200 according to the present invention.

As shown in the drawings, the indirect bonding device 1 according to the present invention includes the jig body portion 100 and the accommodation portion 200 as basic components and may further include a discharge hole portion 300 and/or a window portion 400 according to one embodiment of the present invention.

The jig body portion 100 is a component which forms a body of an indirect bonding jig and may have a shape capable of covering a positive form of the oral cavity of a person to be treated. That is, a shape of one of an upper jaw and a lower jaw of the person to be treated is selected according to the necessity of treatment and is formed in a shape capable of covering each tooth surface.

The accommodation portion 200 is a space formed in the jig body portion 100 and may be formed as a groove in which an orthodontic bracket to be bonded to the tooth surface of the person to be treated is accommodated. Here, such accommodation portions 200 are formed to correspond to the number and positions of orthodontic brackets to be inserted corresponding to a lingual surface and/or labial surface of the tooth surfaces of the person to be treated.

In general, in an indirect bonding device for an orthodontic appliance, an orthodontic bracket is located in a cast model obtained by taking an impression of the teeth of the person to be treated and an upper cast model is manufactured by injecting a material into an upper surface. In general, an operation of taking an impression of teeth may include reproducing a negative form of teeth by injecting alginate into a frame and allowing a patient to put the frame in his or her mouth with his or her teeth and scanning and monitoring the oral cavity of a person to be treated with an oral scanner in his or her mouth.

The accommodation portion 200 of the present invention may be formed as a negative-form groove corresponding to a tooth surface to which the orthodontic bracket of the person to be treated is bonded on the basis of a cast model formed to have the same structure as the oral structure of the person to be treated.

The jig body portion 100 and the accommodation portion 200 formed in the jig body portion 100, as basic components of the present invention, function as an indirect bonding jig for accurately bonding the orthodontic bracket to a tooth to be corrected through vacuum forming.

Here, the jig body portion 100 and the accommodation portion 200 of the present invention may include one or more materials and may include flexible materials to accommodate the orthodontic bracket.

Also, the jig body portion 100 according to one embodiment of the present invention may be configured to be easily divided. That is, a dental practitioner may appropriately divide and use the jig body portion 100 according to the present invention to correspond to a variety of tooth surface and oral structures of the patient.

In addition, the jig body portion 100 according to one embodiment of the present invention may be formed of a transparent material through which the inside is visible and may include a variety of colors in addition thereto.

The indirect bonding device 1 according to one embodiment of the present invention may further include the discharge hole portion 300.

FIGS. 6 and 7A to 7C are a detailed enlarged view illustrating the discharge hole portion 300 and cross-sectional views illustrating a variety of examples of the discharge hole portion, respectively.

Figure 6:
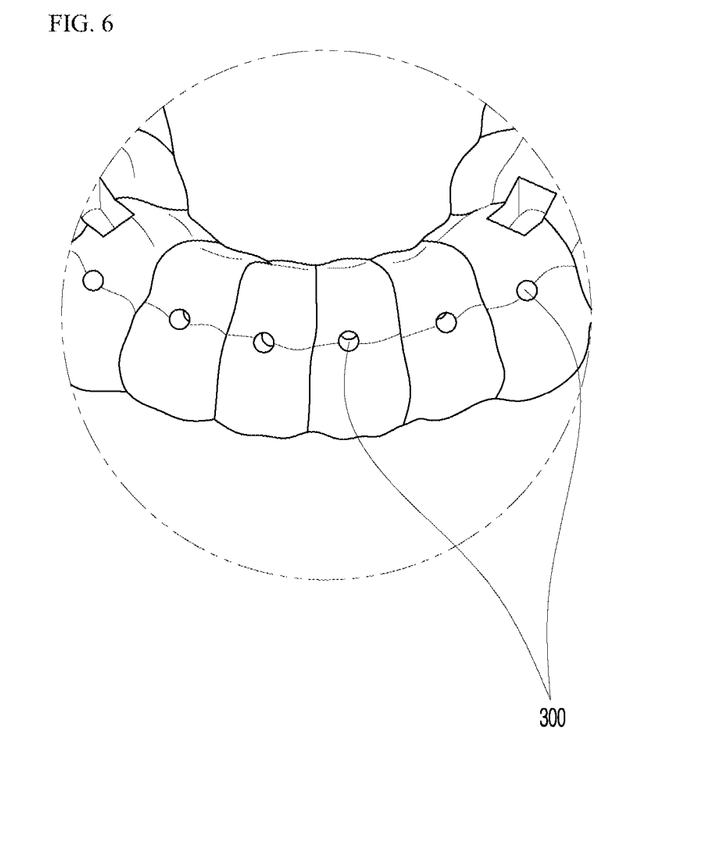
FIG. 6 is an enlarged view illustrating a discharge hole portion according to one embodiment of the present invention.

As shown in FIG. 6, the discharge hole portion 300 may include one or more holes passing through the inside and outside of the jig body portion 100. The discharge hole portion 300 functions as a path through which a bonding agent (resin) is discharged from inside when the bonding agent is excessively injected into the orthodontic bracket.

When the indirect bonding jig is used, more of the bonding agent than necessary is frequently injected to bond the orthodontic bracket. In this case, the excessive amount of the bonding agent which is injected and not used for bonding of the bracket spreads between the indirect bonding jig and the tooth surface of the person being treated and then is bonded to the tooth surface which causes a problem.

Here, in the indirect bonding device 1 according to one embodiment of the present invention, the discharge hole portion 300 passes through the jig body portion 100 and connects a part of the accommodation portion 200 where the orthodontic bracket and the tooth surface of the person being treated come into contact with each other to the outside so that an unnecessary amount of the bonding agent which is excessively injected may be easily discharged outward.

To this end, the discharge hole portion 300 according to one embodiment of the present invention may include a plurality of through holes spaced at certain intervals along a shape of the jig body portion 100. Here, the discharge hole portion 300 may be disposed to correspond to each position at which the groove of the accommodation portion 200 in which the orthodontic bracket is located is formed.

Figure 7A:
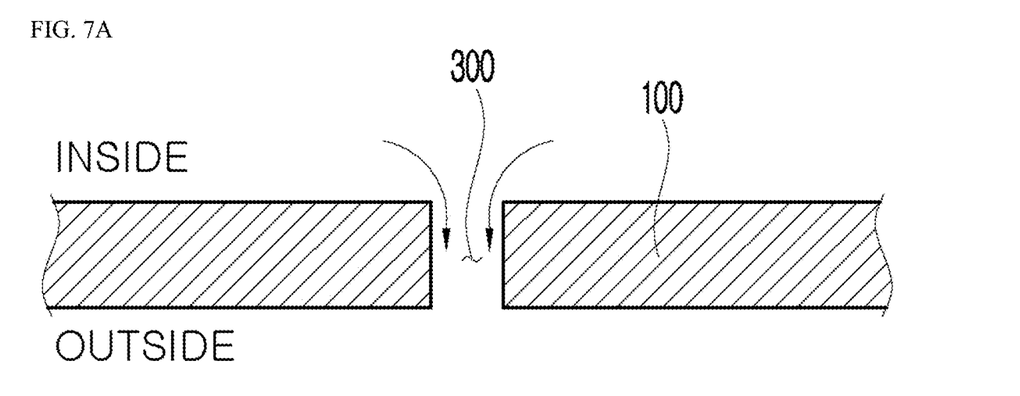
FIGS. 7A, 7B and 7C show cross-sectional views illustrating discharge hole portions according to a variety of embodiments of the present invention.
Figure 7B:
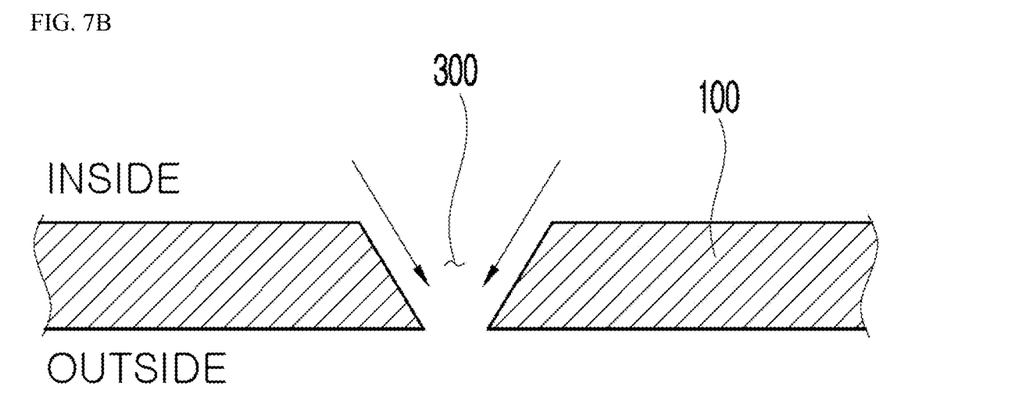
Figure 7C:
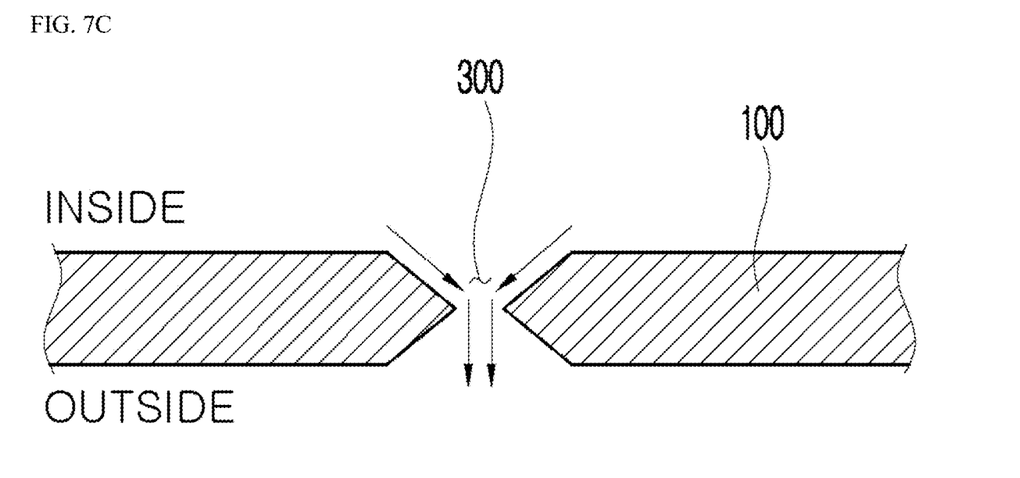

As shown in FIGS. 7A to 7C, the discharge hole portion 300 according to one embodiment of the present invention may have a cross section having a variety of shapes passing through from the accommodation portion 200 therein in which the orthodontic bracket is accommodated to the outside of the jig body portion 100.

As shown in FIG. 7A, the discharge hole portion 300 according to one embodiment of the present invention may be formed to have a uniform cross-sectional area.

As shown in FIG. 7B, the discharge hole portion 300 according to one embodiment of the present invention may have a cross section which gradually decreases in a direction from the accommodation portion 200 therein to the outside of the jig body portion 100. That is, the discharge hole portion 300 may have a cross-sectional area which gradually decreases outward in order to easily guide the excessive bonding agent therein to be collected at the discharge hole portion 300 along the narrowing cross-sectional area.

Meanwhile, as shown in FIG. 7C, the discharge hole portion 300 according to one embodiment of the present invention may have a cross section which gradually decreases and then gradually increases again in a direction from the accommodation portion 200 therein to the outside of the jig body portion 100. The excessive bonding agent may be collected at the discharge hole portion 300 along a cross-sectional area which gradually decreases and then may pass through a cross-sectional area which relatively increases so that it is more efficiently discharged to the outside of the device.

The indirect bonding device 1 according to one embodiment of the present invention may further include the window portion 400.

Figure 8:
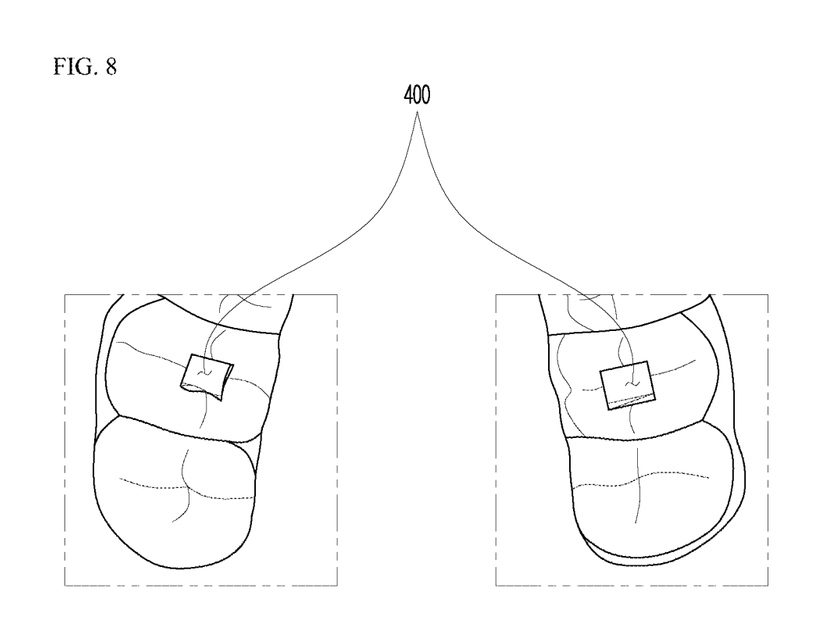
FIG. 8 is an enlarged view illustrating a window portion according to one embodiment of the present invention.
Figure 9A:
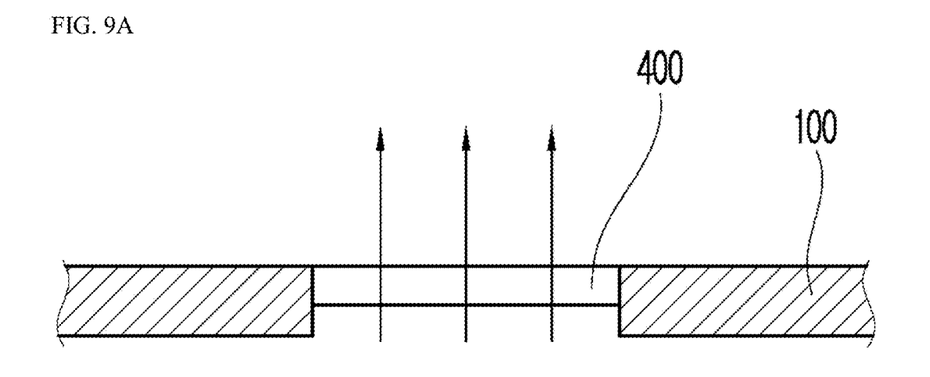
FIGS. 9A, 9B and 9C show cross-sectional views illustrating window portions according to a variety of embodiments of the present invention.
Figure 9B:
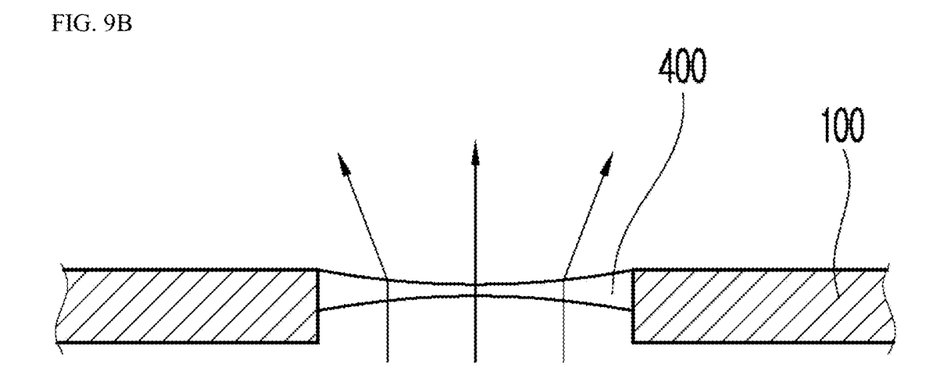
Figure 9C:
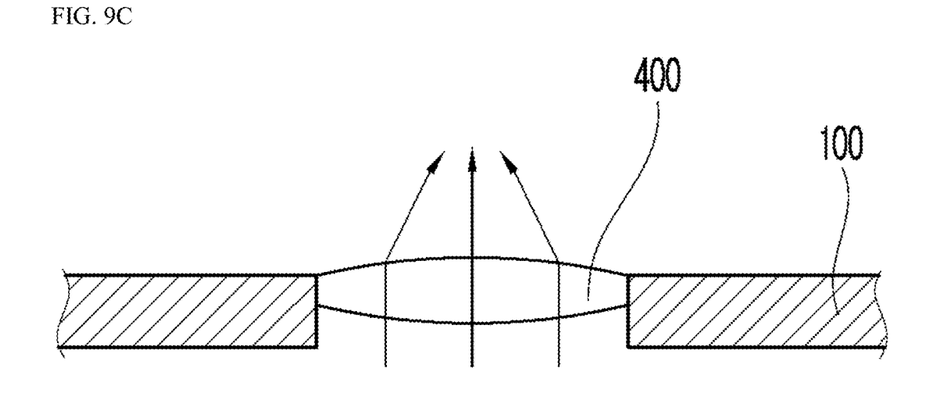

FIGS. 9A, 9B and 9C are a detailed enlarged view illustrating the window portion 400 and cross-sectional views illustrating a variety of examples of the window portion, respectively.

As shown in FIG. 8, the window portion 400 is formed on an outer surface of the jig body portion 100 and formed of a material through which the inside is visible to function as a lens to show the inside. That is, the window portion 400 allows the dental practitioner to see the inside of the jig body portion 100 with the naked eye during a treatment process.

When the indirect bonding jig is used, since the jig covers a labial surface, a lingual surface, a mesiodistal surface, and the like surrounding the occlusal surfaces of the teeth, it is difficult to see whether the indirect bonding device is adequately aligned. This ultimately interferes with adequate fastening of the indirect bonding jig, and thus creates a possibility of improper fastening and acts as a hindrance which makes accurate bonding of the orthodontic bracket difficult.

Here, the indirect bonding device 1 of the present invention allows the dental practitioner may perform treatment while seeing, with the naked eye, a fastening state of the tooth surface in the oral cavity of the person being treated through the window portion 400. Also, this equivalently applies to a case of fastening the device to the cast model obtained by taking the impression of the tooth surface of the person to be treated.

In addition, even when the indirect bonding device 1 of the present invention is removed, after fastening, from the cast model or the oral cavity of the person to be treated, the dental practitioner can see a released state of the fastening and more easily remove the device.

To this end, a plurality of such window portions 400 according to one embodiment of the present invention may be provided at certain intervals along a shape of the jig body portion 100.

As shown in FIG. 9A, the window portion 400 according to one embodiment of the present invention may be formed as a lens in which a central part and an edge have the same thickness.

As shown in FIG. 9B, the window portion 400 according to one embodiment of the present invention may be formed as a concave lens in which a central part is thinner than an edge. Optically, the concave lens allows light to spread out, and thus a large object appears small and a large area can be seen at once. Accordingly, the dental practitioner may view an internal fastening state of the jig body portion 100 in a large range through the window portion 400.

Meanwhile, as shown in FIG. 9C, the window portion 400 according to one embodiment of the present invention may be formed as a convex lens in which a central part is thicker than an edge. Optically, since the convex lens gathers light, a small area is seen and a small object may appear large. Accordingly, the dental practitioner may view the tooth surface to be treated in the jig body portion 100 in a more enlarged state thereof through the window portion 400.

That is, since the dental practitioner selects any one of the above examples of the window portion 400 of the present invention to use according to the needs of treatment, it is possible to more efficiently fasten or remove the indirect bonding device 1.

In addition, the window portion 400 of the present invention is configured to have a lens form as described above or formed to pass therethrough without including an additional material such as a lens to allow the dental practitioner to see the inside of the device.

Another technical feature of the present invention is an indirect bonding method for an orthodontic appliance.

The indirect bonding method of the present invention includes manufacturing a cast model by taking an impression of the teeth of a person to be treated, manufacturing the indirect bonding device 1 for an orthodontic appliance which includes a jig body portion having a shape covering a tooth part of the cast model and an accommodation portion which is a space for accommodating the orthodontic bracket, temporarily attaching the orthodontic bracket to the accommodation portion, applying a bonding agent to the orthodontic bracket, fastening the indirect bonding device 1 to the teeth of the person being treated, and removing the indirect bonding device 1 from the teeth of the person being treated.

Here, the indirect bonding device 1 applied to the indirect bonding method of the present invention further includes the discharge hole portion 300 and/or the window portion 400 according to one embodiment of the present invention.

That is, in the fastening of the indirect bonding device 1 to the teeth of the person being treated, an excessively injected amount of the bonding agent into the indirect bonding device 1 may be discharged outward.

Also, in the removing of the indirect bonding device 1 from the teeth of the person being treated, a dental practitioner removes the indirect bonding device 1 while viewing the inside of the indirect bonding device 1 with the naked eye.

Accordingly, in the indirect bonding method of the present invention, the orthodontic bracket is bonded to a jig manufactured externally instead of in the mouth of a patient which is moving and the whole orthodontic bracket is moved and bonded. As a result, in comparison to a case of bonding an orthodontic bracket directly, it is possible to accurately bond an orthodontic bracket in accordance with a set position and direction.

Also, since a difficulty of bonding the orthodontic bracket is significantly reduced regardless of an opening size of the mouth or a size of a tooth, the orthodontic bracket can be bonded without difficulty regardless of skill level of a dental practitioner and time consumed for bonding the orthodontic bracket can be greatly reduced.

Particularly, in comparison to a case of applying an existing indirect bonding device, an excessive amount of a bonding agent may be easily discharged to prevent damage to teeth and to reduce working time. Also, since the dental practitioner may recognize a fastening state of the indirect bonding device 1 to a target tooth with the naked eye, improper fastening can be prevented and it becomes significantly easy to remove a jig after treatment.

The above description of the present invention is for example, and those of ordinary skill in the art can understand that other detailed modifications are easily made without changes in the technical concept or essentials of the present invention.

Therefore, it should be understood that the above-described embodiments are exemplary and are not limitative in all aspects. For example, respective components which have been described as a single form may be implemented in a distributed manner while components which have described as distributed may be implemented in an integrated form.

The scope of the present invention is defined by the following claims and it should be construed that all changes or modifications derived from the meaning, scope, and equivalent concept of the claims are included in the scope of the present invention.

The invention claimed is:

1. An indirect bonding device for an orthodontic appliance, comprising:
    a jig body portion having a shape configured to cover a tooth surface of a person to be treated;
    an accommodation portion which is an internal space of the jig body portion and in which a groove capable of accommodating an orthodontic bracket is formed; and
    a discharge hole portion formed as one or more holes passing through the inside and outside of the jig body portion and through which an excessively injected amount of a bonding agent is discharged,
    wherein the discharge hole portion has a cross section which decreases in a direction from the accommodation portion to the outside of the jig body portion to a certain portion and then increases in the direction from the accommodation portion to the outside of the jig body portion.

2. The indirect bonding device according to claim 1, wherein the jig body portion is formed of a transparent material.

3. The indirect bonding device according to claim 1 wherein the jig body portion comprises one or more elastic materials.

4. The indirect bonding device according to claim 1, wherein the jig body portion is configured to be dividable.

5. An indirect bonding device for an orthodontic appliance, comprising:
    a jig body portion having a shape configured to cover a tooth surface of a person to be treated;
    an accommodation portion which is an internal space of the jig body portion and in which a groove capable of accommodating an orthodontic bracket is formed; and
    one or more minimizing window portions formed in an outer surface of the jig body portion through which a large portion of the tooth surface compared to a size of a minimizing window portion is visible, wherein the one or more minimizing window portions is formed using a concave lens in which a central part is thinner than both edges thereof; or alternatively,
    one or more magnifying window portions formed in the outer surface of the jig body portion through which a small portion of the tooth surface compared to a size of a magnifying window portion is visible,
    wherein the one or more magnifying window portions is formed using a convex lens in which a central part is thicker than both edges thereof.

6. The indirect bonding device according to claim 5, wherein the jig body portion is formed of a transparent material.

7. The indirect bonding device according to claim 5, wherein the jig body portion comprises one or more elastic materials.

8. The indirect bonding device according to claim 5, wherein the jig body portion is configured to be dividable.

* * * * *